United States Patent [19]

Unger

[11] Patent Number: 4,580,726
[45] Date of Patent: Apr. 8, 1986

[54] UNDER-CAR WASH

[76] Inventor: Michel J. Unger, 4810 Williston St., Baltimore, Md. 21229

[21] Appl. No.: 605,142

[22] Filed: Apr. 30, 1984

[51] Int. Cl.$^4$ .............................................. B60S 3/04
[52] U.S. Cl. .................................... 239/286; 134/100; 134/123; 239/587
[58] Field of Search ...................... 134/45, 93, 94, 99, 134/100, 123, 172, 198; 239/DIG. 6, 280, 286, 587; 15/1.7

[56] References Cited

U.S. PATENT DOCUMENTS

| | | | |
|---|---|---|---|
| 1,724,702 | 8/1929 | Flickinger | 239/286 |
| 2,712,960 | 7/1955 | Grubb, Jr. | 239/286 |
| 2,761,732 | 9/1956 | Anthon | 134/172 X |
| 3,139,096 | 6/1964 | Harris | 134/100 |
| 3,652,014 | 3/1972 | Neville | 239/587 X |
| 4,022,382 | 5/1977 | Engdahl, Jr. | 134/172 X |
| 4,083,495 | 4/1978 | Sharp | 239/287 |
| 4,133,068 | 1/1979 | Hofmann | 15/1.7 |
| 4,156,948 | 6/1979 | Chauvier et al. | 15/1.7 |
| 4,240,174 | 12/1980 | Thiem et al. | 15/1.7 |

FOREIGN PATENT DOCUMENTS

| | | | |
|---|---|---|---|
| 586848 | 6/1934 | Fed. Rep. of Germany | 239/286 |
| 3101149 | 8/1982 | Fed. Rep. of Germany | 134/123 |
| 104860 | 10/1964 | Norway | 239/286 |
| 193154 | 12/1964 | Sweden | 239/286 |

Primary Examiner—Philip R. Coe
Attorney, Agent, or Firm—John F. McClellan, Sr.

[57] ABSTRACT

A system for spray-washing salt and the like from the underside of a motor vehicle has a hollow handle for connection to a garden hose at a first end and to upward spray nozzles on wheels covered by a body or housing with anti-snag shape, at a second end. Steering the spray nozzles to spray in a desired direction within a wide arc requires only twisting the handle in the direction desired. A flexible portion of the handle or alternatively a flexible handle provides this advantage. A detergent or liquid soap container is fixed upright on the handle in position for preventing a user's hand from striking a vehicle being washed on the underside. The handle and the spray may be detached and used apart from the body for hand-held applications.

1 Claim, 3 Drawing Figures

UNDER-CAR WASH

FIELD OF THE INVENTION

This invention relates generally to cleaning and particularly to apparatus for washing the underside of automobiles.

BACKGROUND OF THE INVENTION

Salt rusts and corrodes motor vehicles and other high-way vehicles, and salt is hard to combat. For example, painted surfaces of automobiles may regularly be washed, but the undersurfaces are usually not washed, although most people known that salt water splashes up and collects and rusts body parts from the inside.

Washing the underside of a typical automobile requires some way to get at it, either a hoist or a pit, or other special facility such as a commercial carwash of the type that will wash the underside. Few owners want to lie on the ground and try to reach under a vehicle.

The dollar cost of rustout caused by salt on vehicle undersurfaces is immense, possibly a chief cause of early discard of vehicles, in climatic areas requiring road salting. By the time rust has eaten through at one small spot on the outside so that it is visible, it has usually thinned-out large adjacent areas, making repairs difficult.

A principal object of this invention is to provide a wheeled-spray system for under-car washing that is sufficiently convenient and low priced to find acceptance among vehicle owners leading to savings of large amounts of money across the Nation.

Various spray systems have been suggested in the prior art, including the following in U.S. patents:

U.S. Pat. No. 1,724,702 to B. N. Flickinger, 8-13-29, disclosed a two-wheel device with two up-spray nozzles at the wheeled end, fed by a pipelike handle with a hose attached for fluid supply and a valve. Although this is not for under-body washing of a motor vehicle, evidently it could be so-used and the structure is generally similar;

U.S. Pat. No. 2,712,960 to E. G. Grubb, Jr., 7-12-58, shows another form of up-spraying wheeled device with pipe-like handle, hose connection and valve;

U.S. Pat. No. 2,761,732 to F. B. Anthon, 9-4-56 disclosed another form of the type device, with a soap container from connection to the fluid supply pipe; also note upstanding portion 31 which could be a guard;

U.S. Pat. No. 4,083,495 to R. L. Sharp, 4-11-78, represents a number of caster-equipped spray cleaning devices of the type, all spraying down or ahead.

However, it is believed that none of these devices has provided the advantages necessary to make it widely available and widely in demand as the standard of commerce for the purpose, and to provide such is a principal object of this invention.

SUMMARY OF THE INVENTION

Further objects of the invention are to provide a system as described that includes a body with wheels and an upward spray, all low enough to run beneath a low automobile, a handle with connection at the free end for an ordinary garden hose, and means for flexibly maneuvering the system for maximum convenience and efficiency in a minimum of vertical clearance.

Further objects are to provide a system as described that can be used as a unit and can provide a part of the system for use in special purpose applications.

Yet further objects are to provide a system as described that has a detergent supply in position for not only adding detergent to the spray, but also for guarding against damage to the user's hand as it grips the handle, but will not injure the vehicle against which it may accidentally be thrust.

BRIEF DESCRIPTION OF THE DRAWINGS

The above and other objects and advantages will become more readily apparent on examination of the following descriptions, including the drawings in which like reference numerals refer to like parts.

DETAILED DESCRIPTION

Figure 1:
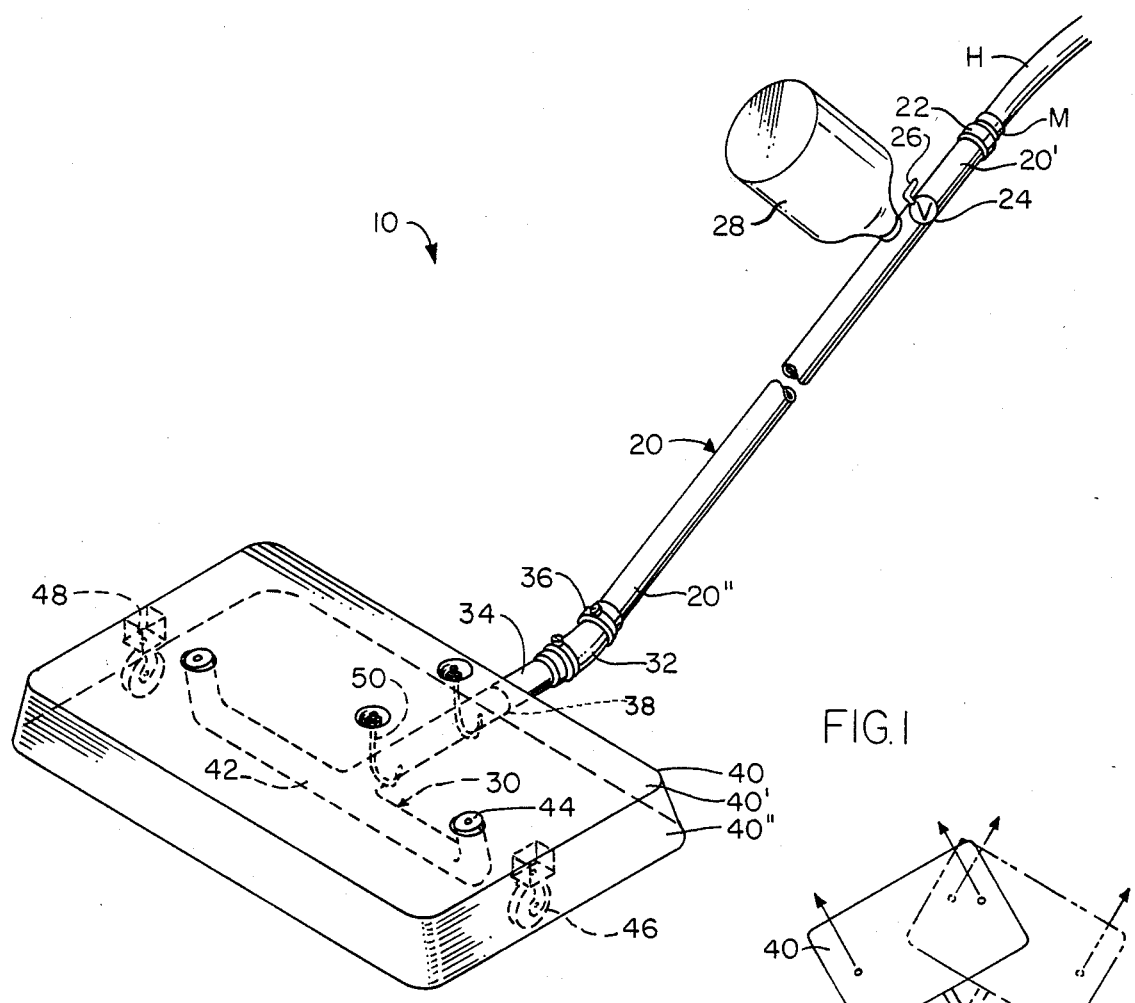
FIG. 1 is a perspective view of a preferred embodiment.

FIG. 1 shows the general details of the invention in embodiment 10. Handle 20 is a length of preferably flexible plastic tubing. At a first end 20' or free end it may terminate in a female garden hose fitting 22 as means for receiving water into the handle from a flexible garden hose H equipped with a matching male fitting M.

A proportioning and shut-off valve 24 may be provided in the handle and may have protruding from it a control 26, both conventional.

The user's hand would normally grip the handle adjacent the valve. Protecting the user's hand from being jammed into an automobile when the system is thrust under it may advantageously be a detergent or liquid soap container 28 fixed upright on the top side of the handle inboard of the valve 24. A separate valve, preferably trigger actuated, may be provided in the neck of the bottle 28. This may be of any suitable conventional design. The container preferably is of soft polyurethane, screwed or otherwise conventionally fastened detachably in communication with the interior of the handle. The valve control is also protected by the container from jamming against and possibly damaging an automobile or itself.

The second end 20" of the handle may be connected to the spray head 30 by means of a short length of flexible hose 32 into which both the handle and the rearward conduit 34 of the spray head are thrust and secured by hose clamps 36.

As an alternative, the handle could fit the flexible hose by means of a conventional male/female garden-hose type connection.

The rearward conduit passes through a hole 38 in the rear-center of the body or housing 40.

A cross conduit 42 of the spray head communicates with the rearward conduit and terminates at each end in an upwardly directed spray nozzle 44. The nozzles may be conventional and may be screwed-in or otherwise fixed to the spray head or may be holes in closed ends of the spray head as desired. For reaching ahead better with the spray, they may be directed slightly forwardly and may have an overlap of the upward cones of spray. The nozzles may be flush with the body 40 so that they will not hang-up on structure beneath automobiles.

Preferably, the body 44 also is of plastic and is so-contoured as not to snag on structure beneath an automobile. It may have a flat or slightly rounded top 40', rounded corners and sides sloped-out in downward direction. Shape of the body is simple and comprehensive, substantially covering the spray head and the rolling means or castors 46, on all sides but the bottom. Each castor may be mounted to a respective downturned lateral sidewall by a conventional swivel clamp 48, and may protrude at the bottom just enough to keep the housing above a surface on which it (the system) is supported. The vertically compressed design is intended to pass under a four inch (10 cm) space beneath an automobile.

Two "J"-clamps 50 with nuts are shown detachably clamping the spray head to the top of the housing. Any other secure holding means may do as well provided that it permits quick attachment and detachment and does not require extra space overhead. The fasteners may be in recesses as indicated.

The swivel-type castors make the device easy to move about as a lawn sprinkler.

Detached from a housing, the sprayhead may be used in conjunction with the handle and a water hose to flush down walls or driveways, to water flowers or the lawn, to flush gutters, or to perform other special tasks such as dispensing disinfectant, insecticide or liquid fertilizers (1.9 m).

The handle may be six feet (1.9 m) long or longer if desired and with a brush slipped over the end may be used as a scrubber with a ready supply of detergent in the container.

As an alternative, the body and conduits in it could be manufactured as an injection molded unit, if desired.

Figure 2:
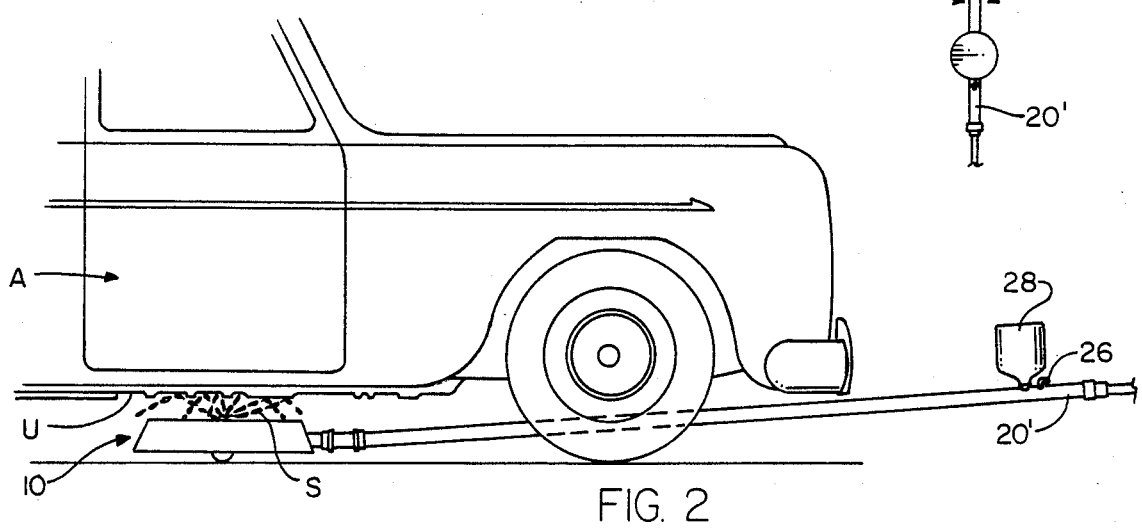
FIG. 2 is a side elevational view of the invention in use.

FIG. 2 shows the underside U of an automobile A (representing as well in this disclosure a low truck or bus or trailer) being spray-washed by upward cones of spray S from the invention.

Container 28 on the handle will strike the vehicle before the user's hand or before the valve control 26 will strike it.

Movement of the system on the castors is controllable conveniently side-to-side or fore-and-aft, by the handle.

Pressing the forward end of the handle down can tip the body and spray more towards the rear, and lifting and forward end of the handle can tip the body and spray head more towards the front.

Figure 3:
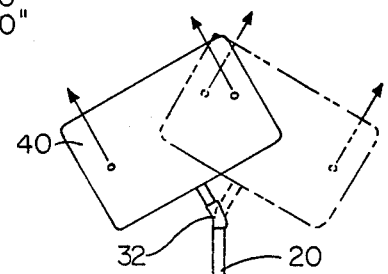
FIG. 3 is a perspective diagram showing different positions of operation.

FIG. 3 shows a further control feature inherent in the design. The castors coact in still another way. When the handle first end 20' is raised above the level of the rearward conduit and is rotated (arrow) about the axis of the handle 20, the flexibility of the hose 32 will cause the body 40 to turn on the castors, left or right as desired. This steers the spray heads also, so that the direction of spray is controllabel for reaching hard to reach places beneath an automobile.

In conclusion, it will be appreciated that this undercar wash system is simple but effective, can be set-up or knocked down for storage or shipment quickly and easily, can be manufactured easily and economically and made available to consumers at a low cost.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by U.S. Letters Patent is:

1. In a system having: a handle, means for receiving liquid into said handle from a hose at a first end of the handle, means for introducing detergent to liquid received, means for spraying upwardly liquid received, at a second end of the handle and means permitting rolling the system about, the improvement comprising in combination: means adapting the system for manual insertion by a user beneath an automobile for spray-washing the underside of an automobile including: a body having an enclosing shape for preventing said means for spraying and means for rolling from snagging on the underside of an automobile and defining top opening therein for said means for spraying, said body substantially enclosing the means for spraying and means permitting rolling, said body being less in height than the nominal clearance under a conventional automobile, the handle including means permitting steering the means for spraying by twisting said handle, said means permitting steering comprising a flexible hose connecting the handle and the means for spraying, said means for spraying and said handle being detachable from said body for hand-carried spraying, said for introducing detergent including means for preventing injury to a user's hand from striking an automobile when inserting the system for said spray washing of the underside of an automobile, comprising said means for introducing detergent being a container fixed upright on the handle adjacent the first end thereof, a valve on said handle with a control protrusive therefrom, and said means preventing also preventing said control from striking an automobile, said means for spraying including at least one upwardly directed nozzle in said housing, and said means permitting rolling comprising a plurality of castors.

* * * * *